United States Patent [19]

Visser

[11] 4,140,542

[45] Feb. 20, 1979

[54] METHOD AND DEVICE FOR RECOVERING MATERIALS FROM A COMPOSITE BODY

[75] Inventor: Leendert Visser, Deurne, Netherlands

[73] Assignee: Handelsmaatschappij OSBO B.V., Deurne, Netherlands

[21] Appl. No.: 747,210

[22] Filed: Dec. 3, 1976

[30] Foreign Application Priority Data

Dec. 8, 1975 [NL] Netherlands .......................... 7514286

[51] Int. Cl.² .......................... B08B 7/04; B03B 1/00; B26D 4/76; B26D 4/78
[52] U.S. Cl. .......................................... 134/18; 83/19; 83/45; 83/176; 83/408; 134/40; 134/60; 134/63; 134/67; 209/3; 209/38; 209/39; 241/24
[58] Field of Search ................... 83/6, 19, 27, 176, 44, 83/45, 408; 134/10, 16, 18, 25 R, 40, 60, 63, 67, 110, 115 R, 9; 241/24, 27, 81; 209/3, 4, 12, 36, 37, 38, 39, 40

[56] References Cited

U.S. PATENT DOCUMENTS

| | | | |
|---|---|---|---|
| 2,319,198 | 5/1943 | Barrans et al. ..................... | 83/408 X |
| 2,413,192 | 12/1946 | Pope ................................... | 83/176 X |
| 2,728,454 | 12/1955 | Heckett ............................... | 209/38 |
| 2,743,632 | 5/1956 | Ames .................................. | 83/176 X |
| 3,053,296 | 9/1962 | Urschel ............................... | 83/45 |
| 3,074,653 | 1/1963 | Schorsch ............................ | 241/24 X |
| 3,386,320 | 6/1968 | Pinkham et al. .................... | 83/408 X |
| 3,749,322 | 7/1973 | Reynolds ............................ | 241/24 |
| 3,865,629 | 2/1975 | Dankoff et al. .................... | 134/40 X |

Primary Examiner—Richard V. Fisher
Attorney, Agent, or Firm—Snyder, Brown & Ramik

[57] ABSTRACT

A method and a device for recovering the various materials of a composite body having a restricted circumference as compared with its length, for example, cables; the object of the invention is to provide a possibility of recovering separately the constituents, particularly the metals, so that these metals maintain a high degree of purity and their original properties; the method is characterized by cutting the composite body along at least one transverse plane and at least one longitudinal plane and by subsequently sorting out the portions of materials reduced in size and separated from one another by the cutting operation; the device is characterized by a clipping apparatus for shortening the body into portions, by a splitting apparatus for cutting through each shortened portion at least along the longitudinal plane and by a sorting system, in which a degreasing section may be provided between the clipping section and the sorting section.

17 Claims, 6 Drawing Figures

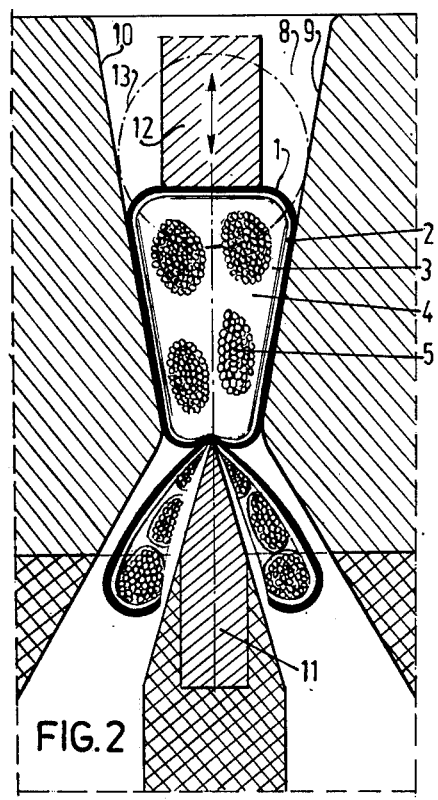
FIG.2
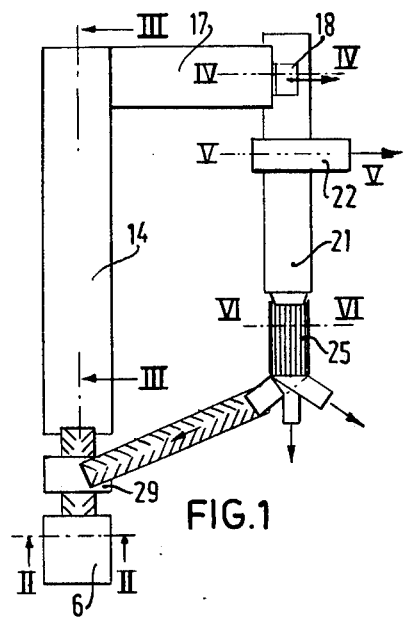
FIG.1
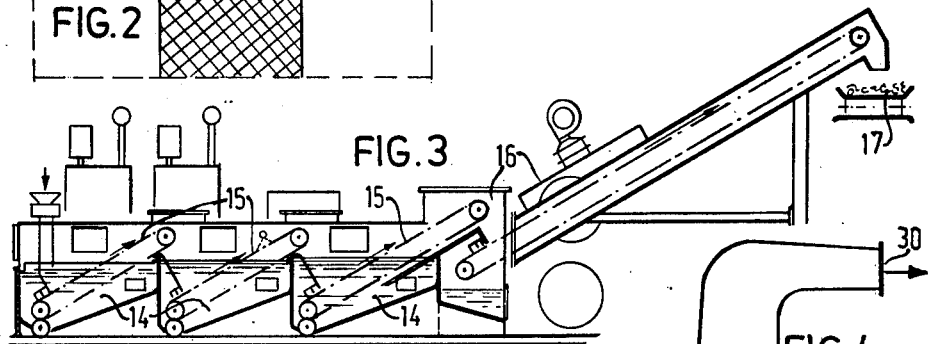
FIG.3
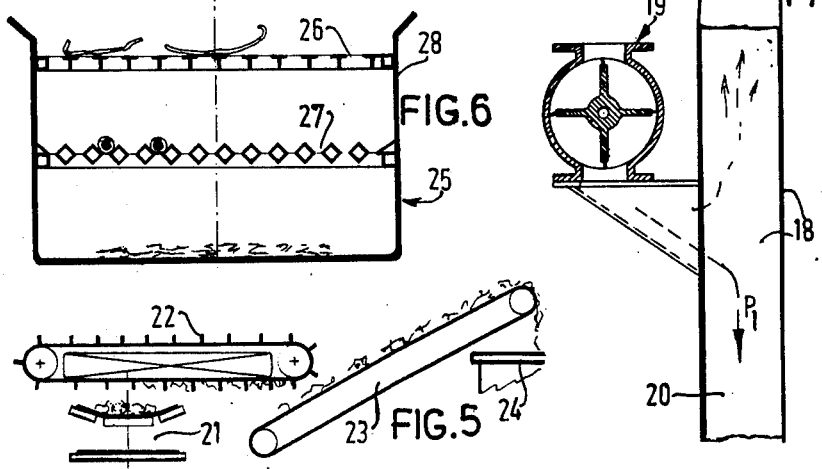
FIG.6
FIG.4
FIG.5

METHOD AND DEVICE FOR RECOVERING MATERIALS FROM A COMPOSITE BODY

The invention relates to a method and a device for recovering the various materials of a composite body having a restricted circumference with its length, for example, cables.

Hitherto it has been common practice to put fire to a pile of cables so that the insulating materials, coatings and filling materials are burned, metals of low melting point, for example, lead melt and metals of high melting point, for example, copper, aluminum and iron are left behind. The drawback of this recovering method is that the metals of low melting point do not completely drip out of the pile and are recovered with a high amount of impurity. The further metals not melting have been subject to a thermal treatment due to the high combustion temperature, which has a detrimental effect on the properties of the original materials. Moreover, with regard to the progressively severer environmental requirements said combustion method is less attractive.

The invention has for its object to provide a possibility of recovering separately the constituents, particularly the metals, so that these metals maintain a high degree of purity and their original properties.

The invention provides a method characterized by cutting the composite body along at least one transverse plane and at least one longitudinal plane and by subsequently sorting out the portions of materials reduced in size and separated from one another by the cutting operation.

This method has the advantage that by cutting up the composite body substantially all compound materials are cut into at least two portions so that the whole composite body is disintegrated into loose portions of material, which considerably facilitates the subsequent sorting operation. If a ground cable has to be treated, the advantage obtained by this invention becomes particularly manifest, since such a cable mainly comprises one or more conductors of small wires relatively insulated by fat-impregnated paper and enveloped by said paper, around which a sheath of lead and iron is arranged for protection. The method proposed by the invention results in all enveloping layers being out through so that the whole cable is disintegrated into loose elements. Owing to the manner of cutting in accordance with the invention said elements have relatively different sizes; for example this is apparent by comparing the core wire with a lead plate equal to at least half the cable envelope. These differences in size have a particularly advantageous effect on the sorting operation.

Cutting the cable in the direction of length can be facilitated by compressing the cable at right angles to the cutting plane starting the incision of the composite body on the most strongly curved circumferential part thereof. The highly increased surface tension of the envelope reduces the power required for cutting.

According to the invention the device suitable for carrying out the method described above is characterized by a clipping apparatus for shortening the body into portions, by a splitting apparatus for cutting through each shortened portion at least along the longitudinal plane and by a sorting system, in which a degreasing section may be provided between the clipping section and the sorting section.

A preferred embodiment of the splitting apparatus comprises a stationary stamp having a continuous slot-like opening for receiving a clipped portion of the composite body. On one side opening a pushing member is arranged to move towards and away from said opening for pushing the shortened body across the opening, whereas on the other side at least one stationary cutter extends in the direction of length of the slot-like opening.

It is advantageous to construct the slot-like opening so that its longitudinal boundary walls converge in the direction towards the cutter so that, when the clipped body is urged through the opening by the pushing member, the body is compressed by the converging longitudinal walls and the cutter will first touch the strongly curved circumferential part of the body and will cut the same.

The method and the device according to the invention will be described more fully hereinafter with reference to an embodiment.

In the drawing:

FIG. 1 is a schematic plan view of a device for treating cables,

FIG. 2 is a schematical sectional view of a splitting apparatus taken on the line II—II in FIG. 1, FIG. 3 is a longitudinal sectional view of a degreasing section taken on the line III—III in FIG. 1, FIG. 4 is a vertical sectional view of a separating device taken on the line IV—IV in FIG. 1 for separating heavy and light materials, FIG. 5 is a sectional view of a magnetic separating section taken on the line V—V in FIG. 1 for removing iron parts, FIG. 6 is a sectional view of a sieving device taken on the line VI—VI in FIG. 1 for separating large and small portions of material.

FIG. 1 is a schematical plan view of a device for working up ground cables, in particular. FIG. 2 shows a section of such a ground cable, reference numeral 1 designating a hemp sheath, 2 an iron sheath, 3 a lead sheath, 4 a paper filling impregnated with grease and 5 a copper or aluminum wired conductor. At the station 6 in FIG. 1 a cable of undefined length is first cut into pieces of a given length, for example, 15 cms, which means cutting along a transverse plane.

The clipped portions of the composite cable body are subsequently cut at station 6 of FIG. 1 by means of, for example, an eccentric press by a splitting device shown in a cross sectional view in FIG. 2 in the direction of length. The eccentric press is provided with a die 7 having a continuous, slot-like opening 8, whose sidewalls 9 and 10 are converging towards a stationary cutter 11. The clipped cable portion is urged by means of a vertically reciprocatory pushing member 12 through the slot-like opening 8 against the cutter edge 11 so that the cable is split up in the direction of length along the central plane. The two halves or discrete sections of a cable portion are shown on either side of the cutter 11 in FIG. 2.

Owing to the converging sidewalls 9 and 10 of the slot-like opening 8 the initially round cable (see the dot-and-dash circle 13) is gradually forced into a trapezoidal cross section, the lowermost circumferential part of the cable being thus strongly curved. This lowermost circumferential part is touched first by the cutter 11 and owing to the highly increased surface tension of the composite sheath splitting up of the cable is easier and requires less power. Moreover, by compressing the body at right angles to the plane of longitudinal splitting, the cross-sectional area through which the longitudinal splitting is effected is increased, thereby increasing the area of the core which is cut when the sheath and core are both cut or split to produce the aforementioned discrete sections thereof.

After the cable is cut into portions and split up, the loose portions enter a degreasing device (see FIG. 3) in order to dissolve and remove all grease or the cable. A particular degreasing device comprises at least one bath 14 containing a grease-dissolving liquid; in the embodiment described three baths of this kind are arranged in sequence. Each bath is provided with a conveyor 15 rising up out of the liquid bath and being driven so that the upper run supporting the portions to be degreased conveys said portions upwards. Such an arrangement has the advantage that owing to the inclined position of the conveyor belt 15 and owing to the upward pressure of the liquid bath 14 the portions to be cleaned are not directly carried upwards, but they partly tumble down across one another and are gradually carried out of the bath. This produces intimate mingling with the liquid in the bath 14, whilst apart from a conveying function the conveyor has a scraping function. Obviously the first of the three sequential baths will be soiled most. A particularly advantageous mode of operation resides in providing only the last bath on the right-hand side in FIG. 3 with fresh or regenerated liquid and passing this subsequently to preceding baths.

After the last liquid bath a drying section 16 is provided, where the liquid adhering to the portions of material is removed by evaporation. In connection with environmental requirements the inlets and outlets of the degreasing section are provided with active carbon filters for purifying the vapours or the air contained in the section.

The degreased and cleaned portions of material then arrive at a belt 17, shown on the right-hand side in FIG. 3 and in the upper part of FIG. 1, for carrying the portions upwards to a separating device, which is shown in the sectional view of FIG. 4.

The separating device 18 comprises an air sluice 19, into which the material is shed from above from the belt 17, after which the material is laterally moved into a chute 20. In the tubular chute 20 an upward air stream is generated, the strength thereof being such that the light-weight material, particularly hemp and paper, are conducted away through the outlet opening 21, whereas the remaining metal parts drop down in the direction of the arrow P1.

The tubular chute 20 delivers the dropping metals on the bottom side directly to a conveyor belt 21, above which midway its length a magnetic separator 22 (see FIG. 5) is arranged. The magnetic separator is formed by an endless belt, between the lower and upper runs of which a magnet is arranged for drawing iron particles upwards out of the material on the belt 21, the endless conveyor giving them off to an elevator 23, which terminates above a container 24.

The non-magnetizable parts of material are delivered by the conveyor 21 to a sieving device 25 (see FIG. 6). Owing to the specific mode of cutting in accordance with the invention the remaining parts of material have different sizes so that the various parts are separated according to size. The device shown in FIG. 6 comprises two sieves 26 and 27 set in a tray 28. The parts of material are supplied to the sieve 26, which consists of a bar grid of T-section profiles, which passes the elongated wire-shaped parts of material originating from the cores 5, whereas it retains the lead plates of the cable sheath.

The second sieve 27 serves for passing naked wire material from the cores 5 and for retaining those parts of the cores which are still covered by an insulating layer.

By causing the tray 28 to vibrate a transport effect can be obtained at right angles to the plane of the drawing in FIG. 6 so that the three sieves can give off the material to three outlets, two of which communicated with a container for receiving lead plates and plate material respectively from the sieve 26 and the tray 28. One outlet communicating with the sieve 27 delivers the material to a conveyor which delivers the sieved fraction of wire-material covered with insulating material to a hammer mill 29, where the material is mechanically separated from the insulating layer. The hammer mill delivers the worked parts to a conveyor between the cutting section 6 and the degreasing section 14, which parts subsequently pass through the whole process described above.

The invention is not restricted to the embodiment depicted above. For example, the cutting section 6 shown in detail in FIG. 2 may be provided with two stationary cutters 11 for cutting a clipped cable portion along two parallel longitudinal planes. Moreover said sidewalls 9 and 10 could be parallel to each other, at least one of which is movable, as indicated by the arrow in FIG. 2, in order to compress the clipped cable portion by moving the sidewalls to each other. Degreasing may be carried out in a manner differing from the above-mentioned dissolving process, whilst with specific composite bodies the degreasing section can be completely removed. This also applies to any subsequent part of the sorting device formed by the elements described with reference to FIGS. 4, 5 and 6.

What is claimed is:

1. A method of recovering the various materials of a composite body having an outer sheath and a core comprising a plurality of longitudinally coextending discrete sections and a circumference which is restricted as compared with its length, particularly cables, characterized by cutting said body along at least one transverse plane and severing said body longitudinally to cut completely through both said sheath and said core thereby to provide at least two separate portions thereof and by subsequently sorting out the various materials from said portions.

2. A method as claimed in claim 1 characterized in that the transverse cut is made prior to the longitudinal severing.

3. A method as claimed in claim 1 characterized in that prior to the longitudinal severing the body is compressed at right angles to the cutting plane to increase the cross-section area through which said longitudinal severing is effected.

4. A method as claimed in claim 1 characterized in that said various materials are degreased prior to sorting.

5. A device for recovering the various materials of a composite body such as a cable having a circumference which is restricted as compared with its length, said device comprising in combination, a clipping apparatus for clipping the body into portions, a splitting apparatus for cutting each clipped portion along at least one longitudinal plane, and a sorting system for recovering the various materials, said splitting apparatus comprising a die having means defining a continuous, slot-like opening for receiving each clipped portion of the body and a pushing member adapted to move on one side towards and away from the opening and at least one stationary cutter arranged on the other side and extending throughout the length of the slot-like opening.

6. A device as claimed in claim 5 characterized in that said means comprises a pair of longitudinal walls converging in the direction towards the cutter and defining said slot-like opening therebetween.

7. A device as claimed in claim 5 characterized in that said means comprises a pair of longitudinal walls defining said slot-like opening therebetween, at least one of said longitudinal walls being movable in order to compress a clipped cable portion before said portion is longitudinally cut.

8. A device as claimed in claim 5 provided with a degreasing section, characterized in that the degreasing section is arranged directly after the splitting apparatus.

9. A device as claimed in claim 8 characterized in that the degreasing section comprises at least one bath containing a degreasing liquid and a conveyor rising up out of the bath.

10. A device as claimed in claim 9 characterized in that three degreasing baths are arranged in sequence so that the conveyor of one bath directly transfers the material to be degreased to the next following bath.

11. A device as claimed in claim 10 characterized in that the baths communicate with one another in order to conduct the liquid to a preceding bath.

12. A device as claimed in claim 8 characterized in that the sorting system is provided with a magnetic separator for separating out magnetizable material, for example, iron.

13. A device as claimed in claim 8 characterized in that the sorting system is provided with a sieve section for separating out differently sized portions of material, for example wire-shaped material and plate-shaped material.

14. A device as claimed in claim 13 characterized in that the sieve is formed by a vibratory grating.

15. A device as claimed in claim 13 characterized in that a mechanical separating apparatus, for example a hammer mill, is arranged after the sieve section.

16. A device as claimed in claim 15 characterized in that the outlet of the mechanical separating apparatus communicates with the inlet of the degreasing section.

17. A device as claimed in claim 5 characterized in that the sorting system is provided with a tubular chute, in which an air stream is produced for separating lightweight and heavy materials, for example, paper and metals respectively.

* * * * *